July 9, 1929.  H. ELDRIDGE  1,719,970
PROCESS OF PRODUCING CALCIUM CARBIDE AND PIG IRON
Filed March 8, 1927
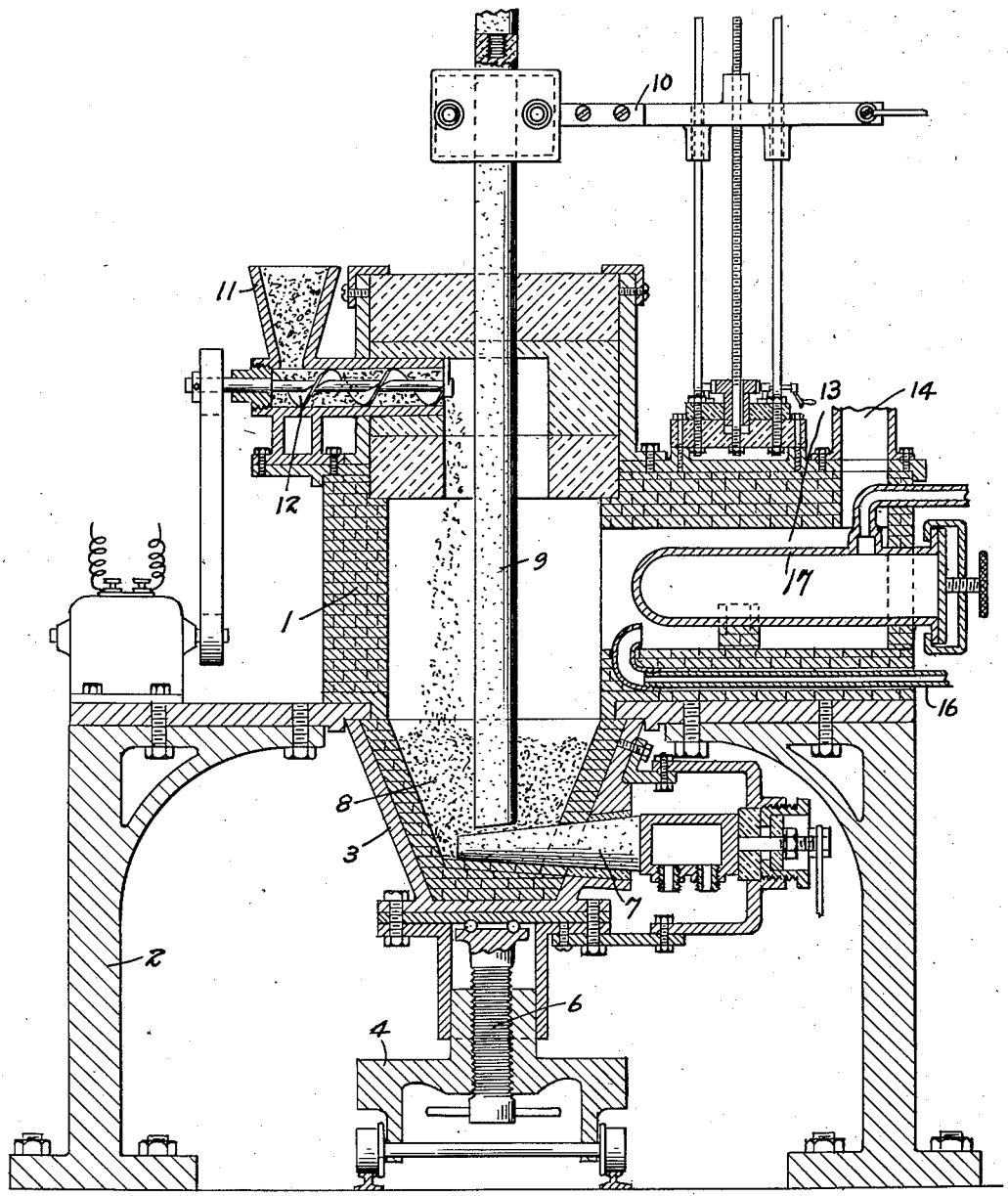
INVENTOR
HILLIARY ELDRIDGE
BY
ATTORNEYS Patented July 9, 1929.

1,719,970

UNITED STATES PATENT OFFICE.

HILLIARY ELDRIDGE, OF OAKLAND, CALIFORNIA, ASSIGNOR OF ONE-SIXTEENTH TO MARY ELLIOT McGHEE, OF OAKLAND, CALIFORNIA, ONE-SIXTEENTH TO MARY ELIZABETH WALDRON, OF ALBANY, CALIFORNIA, AND BY DECREE OF COURT SEVEN-EIGHTHS TO MARTHA KIESLICH ELDRIDGE, WIDOW OF SAID HILLIARY ELDRIDGE, DECEASED.

PROCESS OF PRODUCING CALCIUM CARBIDE AND PIG IRON.

Application filed March 8, 1927. Serial No. 173,763.

The present invention relates to improvements in a process for producing calcium carbide and pig iron and its particular object is to combine the two processes into one operation, allowing the iron oxide to be reduced in the manufacture of calcium carbide without increasing the cost of the procedure so that the reduction of iron oxide is accomplished without expense.

A further object of the invention is to disclose a simplified process of producing calcium carbide in connection with the reduction of iron oxide which allows calcium carbonate to be used as one of the ingredients of the mixture to be treated for producing calcium carbide, while thus far it has been considered necessary to first calcine the calcium carbonate before mixing the same with carbon for the production of calcium carbide.

My process is preferably carried out in an electric furnace and in the presence of a draft exercising continuous suction on the surface of the mixture treated in the furnace for preventing an equilibrium from being established between the vapors rising from the mixture under the influence of the heat and the mixture. A furnace was adapted for this purpose as has been described in detail in my co-pending application, Serial #31,391 and will be briefly referred to in the present specification as far as is necessary for carrying out my process.

The said furnace was particularly designed for the production of calcium carbide by subjecting a mixture of lime and carbon to the heat of an electric arc and for utilizing the carbon monoxide formed during the process for heating retorts arranged in the wall of the furnace, the heated retorts being used for treatment of materials useful in connection with the production of calcium carbide. For the purpose of rendering carbon monoxide usable for this purpose air was injected into the same before it reached the retorts to be heated, the air being directed so as to exercise suction on the surface of the mixture of lime and carbon.

I have now observed that if iron oxide is added to the mixture with a suitable change in the proportion of the carbon added the iron oxide may be reduced in the same process, and that furthermore in a process of this character calcium carbonate may be substituted for the lime with substantially the same result as though lime were used. This considerably cheapens the production of calcium carbide since lime is many times more expensive than the raw product calcium carbonate.

The furnace described in detail in my co-pending application is shown in vertical section in the accompanying drawing and may be briefly described for the purpose of the present application, as comprising a side wall section 1 resting in elevated position on a suitable frame 2 and a portable bottom 3 resting on a truck 4, and adapted to be lowered and lifted by means of a threaded element 6. A carbon electrode 7 is transversely supported in the bottom piece 3, which is formed with a central cavity 8, and a second electrode 9 is vertically supported in an adjustable arm 10 to extend the side wall structure into the cavity 8 in to operative proximity to the first electrode 7. A hopper 11 is provided with a conveyer 12 for feeding the material to be treated into the cavity 8. A radial chamber 13 is formed in the side wall structure 1 and connects with a flue 14 leading to the atmosphere, while a tube 16 extending through the side wall structure into the chamber 13 allows an air-blast to be injected into the gases rising from the cavity 8 for mixing the gases, whereby the latter are rendered combustible and also for producing suction on the surface of the material to be treated for preventing an equilibrium of pressure from being established.

A retort 17 is supported in the chamber 13 and may be filled with any suitable material it may be desired to treat by subjecting the same to the heat of the products of combustion.

In my present process I use the following materials: calcium carbonate ($CaCO_3$), carbon (C), and iron oxide ($Fe_3O_4$). These are mixed and placed in the cavity 8 in suitable proportions and are subjected to the heat of the arc, while at the same time suction is produced on the upper surface of the mixture by the tube 16 for carrying off the gases liberated during the process, namely: carbon monoxide and carbon dioxide. The carbon dioxide driven off by the calcining of the calcium carbonate is converted in the presence of carbon into carbon monoxide which functions as a reducing agent for the iron oxide.

The products resulting from these reactions are pig iron, commonly known as cast iron, $CaC_2$ or calcium carbide, $CO_2$ or carbon dioxide, and CO or carbon monoxide, the latter gases being carried off by the draft and being preferably utilized for heating the retort 17. It should be noted that the above process is not necessarily confined to iron oxide but may be applied to any other oxide that is reducible by heat and carbon.

It should be further understood that lime may be used instead of calcium carbonate, but that it usually is not advisable to use lime since it is much more expensive than calcium carbonate.

It should further be understood that while I preferably use the furnace illustrated in my co-pending application and shown in part in the present application, any other electric furnace may be used provided that there should be means for creating a draft which exhausts the furnace gases as fast as they are evolved by the reduction, prevents the establishment of an equilibrium of pressure and permits of continuous reaction of oxides and production of compounds.

I claim:

The method of manufacturing calcium carbide and pig iron which consists in subjecting a mixture of calcium carbonate, carbon and iron oxide to the action of an electric arc whereby carbon monoxide and carbon dioxide are released and in injecting a current of air into the gases above the treated mass and in a direction away from the same for combusting the gases and for producing suction above the mixture.

HILLIARY ELDRIDGE.